US010471385B2

(12) United States Patent
Gale

(10) Patent No.: US 10,471,385 B2
(45) Date of Patent: Nov. 12, 2019

(54) MULTICOMPONENT COMPOSITIONS FOR MERCURY REMOVAL

(71) Applicant: Novinda Corporation, Denver, CO (US)

(72) Inventor: Thomas K. Gale, Highlands Ranch, CO (US)

(73) Assignee: Novinda Corporation, Denver, CO (US)

( * ) Notice: Subject to any disclaimer, the term of this patent is extended or adjusted under 35 U.S.C. 154(b) by 0 days.

(21) Appl. No.: 14/774,254

(22) PCT Filed: Mar. 12, 2014

(86) PCT No.: PCT/US2014/023989
§ 371 (c)(1),
(2) Date: Sep. 10, 2015

(87) PCT Pub. No.: WO2014/164975
PCT Pub. Date: Oct. 9, 2014

(65) Prior Publication Data
US 2016/0296886 A1 Oct. 13, 2016

Related U.S. Application Data

(60) Provisional application No. 61/778,778, filed on Mar. 13, 2013.

(51) Int. Cl.
B01D 53/64 (2006.01)
B01D 53/81 (2006.01)
B01D 53/02 (2006.01)
B01D 53/50 (2006.01)
B01J 20/04 (2006.01)
B01J 20/10 (2006.01)
B01J 20/20 (2006.01)
B01J 20/30 (2006.01)
B01J 20/32 (2006.01)
B01J 20/02 (2006.01)
B01D 15/08 (2006.01)
B01D 53/40 (2006.01)
B01J 20/08 (2006.01)
B01J 20/16 (2006.01)

(52) U.S. Cl.
CPC ............ B01D 53/64 (2013.01); B01D 15/08 (2013.01); B01D 53/02 (2013.01); B01D 53/40 (2013.01); B01D 53/508 (2013.01); B01D 53/81 (2013.01); B01J 20/02 (2013.01); B01J 20/0285 (2013.01); B01J 20/041 (2013.01); B01J 20/043 (2013.01); B01J 20/045 (2013.01); B01J 20/08 (2013.01); B01J 20/10 (2013.01); B01J 20/16 (2013.01); B01J 20/20 (2013.01); B01J 20/3007 (2013.01); B01J 20/3021 (2013.01); B01J 20/3028 (2013.01); B01J 20/3293 (2013.01); B01D 2251/304 (2013.01); B01D 2251/306 (2013.01); B01D 2251/404 (2013.01); B01D 2251/604 (2013.01); B01D 2251/606 (2013.01); B01D 2251/608 (2013.01); B01D 2253/11 (2013.01); B01D 2253/304 (2013.01); B01D 2257/30 (2013.01); B01D 2257/602 (2013.01); B01D 2258/0283 (2013.01); B01J 2220/42 (2013.01)

(58) Field of Classification Search
None
See application file for complete search history.

(56) References Cited

U.S. PATENT DOCUMENTS

| 4,884,396 A * | 12/1989 | Miyamoto ............. B01D 53/52 423/230 |
| 5,126,300 A * | 6/1992 | Pinnavaia ............. B01D 53/508 502/84 |
| 5,502,021 A * | 3/1996 | Schuster ................ B01D 53/64 423/210 |
| 2007/0119300 A1* | 5/2007 | Yang ...................... B01D 53/02 95/107 |
| 2007/0140945 A1* | 6/2007 | Copenhafer ............. C01D 7/12 423/421 |
| 2011/0123422 A1* | 5/2011 | Wang ................... B01D 53/025 423/240 S |

FOREIGN PATENT DOCUMENTS

DE          3915934         * 11/1989

* cited by examiner

Primary Examiner — Sheng H Davis
(74) Attorney, Agent, or Firm — Dorsey & Whitney LLP

(57) ABSTRACT

Herein are disclosed compositions of matter, processes of manufacture and processes of use of solid state admixtures that include an inorganic base and a sulfide selected from the group consisting of an ammonium sulfide, an alkali metal sulfide, an alkali-earth metal sulfide, transition metal sulfide, and a mixture thereof. The composition can include solid state inorganic bases (e.g., calcium hydroxide and sodium sesquicarbonate) and/or gaseous bases (e.g., ammonia) and, optionally, a support material for one or more of the inorganic base and sulfide. The compositions are useful for capturing environmental contaminants, for example, from the flue gas of a coal fired power plant.

12 Claims, No Drawings

MULTICOMPONENT COMPOSITIONS FOR MERCURY REMOVAL

CROSS-REFERENCE TO RELATED APPLICATIONS

This disclosure claims the benefit of priority to U.S. Provisional Patent Application 61/778,778 filed on 13 Mar. 2013, the entire disclosure of which is incorporated herein in its entirety.

FIELD OF THE INVENTION

The present invention is directed to methods of using compositions for removing one or more environmental contaminant(s) (e.g., mercury or sulfur) from gas streams, e.g., industrial smoke stacks; flue ducts, and the like. The compositions, "flue gas scrubbing compositions", are particularly useful for removal of mercury from the flue gas emitted by coal-burning electrical power plants.

BACKGROUND

Environmental contaminants contained in emissions from coal-fired and oil-fired power plants are a major environmental concern. Particulate matter (e.g., fly ash), nitrates, sulfates, and mercury emissions are restricted because these emissions can yield, for example, acid rain and serious neurotoxic effects. The removal of particulate matter has been addressed through the installation of baghouses, electrostatic precipitators, cyclone separators, or cyclone separators with baghouse filters in the flue gas ducts. The removal of nitrates and sulfates has been addressed through the addition of lime (calcium oxides and/or hydroxides) to the flue gas and the collection of the lime reaction product (e.g., $CaSO_4$) with the particulate matter. The removal of mercury can be addressed by absorption with a mercury absorbent material. Unfortunately, the mercury absorbent materials and lime are often chemically incompatible and/or the mercury absorbent material is fiscally incompatible with the collection and disposal of the particulate material which is often sold into the concrete industry.

The most common method for reduction of mercury emissions from coal-fired and oil-fired power plants is the injection of powdered, activated carbon into the flue gas stream. The activated carbon is a high surface area material that provides for the adsorption of the mercury and the agglomeration of the particle bound mercury. The disadvantage of adding activated carbon into the flue gas stream is the retention of the activated carbon in the fly ash waste stream. Fly ash from coal-fired power plants is often added to concrete, where the presence of the activated carbon adversely affects performance, thereby making the inclusion of the carbon fiscally incompatible with the flue gas scrubbing process.

Another method for reducing Hg emissions is through the addition of chemical species that react with mercury to chem-adsorb the elemental and oxidized mercury. One class of materials capable of chemically reacting with Hg is metal sulfides. U.S. Pat. Nos. 6,719,828 and 7,578,869 teach the preparation of supported metal sulfides. A major disadvantage of these supported metal sulfides is that these materials are known to react with lime, for example, yielding copper metal and calcium sulfide materials. See e.g., Habashi et al., Metallurgical Transactions, 1973, 4, 1865. These reaction products destroy the absorptive capacity of mercury from the flue gas. Therefore, the use of supported metal sulfides has been physically separated from the use of lime in the flue gas scrubbing process.

There is still an ongoing need to provide improved pollution control sorbents and methods of their manufacture, particularly sorbents that are stable both in acidic flue gases and in the presence of acid reducing species.

SUMMARY

One embodiment is a composition that includes a solid state admixture of an inorganic base and a sulfide selected from the group consisting of an ammonium sulfide, an alkali metal sulfide, an alkali-earth metal sulfide, transition metal sulfide, and a mixture thereof.

Another embodiment is a manufacturing process that includes providing the solid state admixture by intimately mixing the inorganic base and the sulfide.

Still another embodiment is a process of capturing an environmental contaminant from a fluid, the process that includes admixing a fluid containing an environmental contaminant with the composition that includes the solid state admixture; and separating the fluid and the composition; wherein the separated fluid includes a lower concentration of the environmental contaminant after separation from the composition.

Yet another embodiment is a composition that includes an admixture of anhydrous ammonia and a supported sulfide, the supported sulfide comprising a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof.

Still yet another embodiment is a process of capturing an environmental contaminant from a fluid, the process includes admixing a fluid containing an environmental contaminant with anhydrous ammonia; admixing the fluid containing the environmental contaminant with a supported sulfide; and admixing the anhydrous ammonia and the supported sulfide in the fluid; wherein the supported sulfide comprises a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof.

Another embodiment is a process of capturing an environmental contaminant from a fluid, the process includes admixing anhydrous ammonia and a supported sulfide to provide a composition; and admixing the composition with the fluid containing an environmental contaminant; wherein the supported sulfide comprises a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof.

DETAILED DESCRIPTION

A first embodiment is a composition that includes a solid state admixture of an inorganic base and a sulfide selected from the group consisting of an ammonium sulfide, an alkali metal sulfide, an alkali-earth metal sulfide, transition metal sulfide, and a mixture thereof. In one preferable example, the composition includes a support carrying the admixture. Preferably, the support is selected from the group consisting of a silicate, an aluminate, an aluminosilicate, a carbon, and a mixture thereof. For example, the support can be a phyllosilicate selected from the group consisting of bentonite, montmorillonite, hectorite, beidellite, saponite, nontronite, volkonskoite, sauconite, stevensite, fluorohectorite, laponite, rectonite, vermiculite, illite, a micaceous mineral, makatite, kanemite, octasilicate (illierite), magadiite, kenyaite, attapulgite, palygorskite, sepoilite, and a mixture thereof. The support can be a smectite clay e.g., bentonite, montmorillonite, hectorite, beidellite, saponite, nontronite, volkonskoite, sauconite, stevensite, and/or a synthetic smectite derivative, particularly fluorohectorite and laponite; a mixed layered clay, particularly rectonite and their synthetic derivatives; vermiculite, illite, micaceous minerals, and their synthetic derivatives; layered hydrated crystalline polysilicates, particularly makatite, kanemite, octasilicate (illierite), magadiite and/or kenyaite; attapulgite, palygorskite, sepoilite; or any combination thereof. The support can be an activated carbon, a powder activated carbon, a graphite, or a mixture thereof. More preferably, the admixture is distributed on the surface of the support.

In a preferred example, the support carries the admixture. Herein this means the support is in intimate contact with each individual component of the admixture (e.g., the inorganic base and, individually, the sulfide). In one instance, a portion of the inorganic base and a portion of the sulfide are supported on a support particulate. That is, the support is preferable a particulate material (e.g., consists of a plurality of distinct particles) and, in this instance, a single particulate carries both the inorganic base and the sulfide. Notably, the inorganic base and/or the sulfide can be particulates, preferably, having a particle diameter less than 25%, 20%, 15%, or 10% of a particle diameter of the support. In another instance, the inorganic base and the sulfide can be carried on distinct supports. For example, a plurality of particles of the support can carry the inorganic base and a plurality of particles of the support can carry the sulfide. In a subset of this instance, the support carrying the inorganic based is distinct from the support carrying the sulfide, the distinction can be in particle size, composition, or a combination thereof. Still further, the composition can include an admixture of a plurality of particles where two are selected from the group consisting of the support carrying the inorganic base, the support carrying the sulfide, and the support carrying both the inorganic based and the sulfide.

The solid state admixture of an inorganic base and a sulfide can include distinct phases, regions or particulates of each of the inorganic base and sulfide and/or can include the reaction product of the inorganic base and the sulfide. In a preferable instance, the admixture includes distinct phases, regions or particulates (e.g., crystallites) of the inorganic base and the sulfide. In instances wherein the admixture consist of or consist essentially of distinct phases, regions or particulates of the inorganic base and sulfide, the inorganic base can carry the sulfide and/or the sulfide can carry the inorganic base. Examples include core-shell arrangements and agglomerations of smaller particulates upon a larger particulate.

In one instance, the inorganic base can be selected from the group consisting of calcium hydroxide, sodium sesquicarbonate (trisodium hydrogendicarbonate), sodium carbonate, sodium bicarbonate, potassium carbonate, calcium carbonate, and a mixture thereof. Preferably, the inorganic base is selected from calcium hydroxide and sodium sesquicarbonate. In one example, the inorganic base is calcium hydroxide (e.g., hydrated lime); in another example, the inorganic base is sodium sesquicarbonate (e.g., trona).

The calcium hydroxide can be hydrated lime; hydrated lime is a dry powder manufactured by treating quicklime with sufficient water to satisfy its chemical affinity for water, thereby converting the oxides to hydroxides. Depending upon the type of quicklime used and the hydrating conditions employed, the amount of water in chemical combination varies, for example: high calcium hydrated lime contains generally 72% to 74% calcium oxide and 23% to 24% chemically combined water; dolomitic hydrated lime (normal) contains about 46% to 48% calcium oxide, 33% to 34% magnesium oxide, and 15% to 17% chemically combined water; dolomitic hydrated lime (pressure) contains about 40% to 42% calcium oxide, 29% to 30% magnesium oxide, and 25% to 27% chemically combined water.

The sulfide can be a terminal or bridged sulfide (i.e., $S^{2-}$); can be a polysulfide (e.g., $S_2^{2-}$, $S_3^{2-}$, $S_4^{2-}$, $S_n^{2-}$); can be a thiolate (i.e., $SH^-$, $SR^-$); or can be a hydropolysulfide (e.g., $S_2H^-$). In one example, the sulfide is a polysulfide. In an example, the sulfide can be a transition metal sulfide selected from the group consisting of a manganese sulfide, an iron sulfide, a cobalt sulfide, a nickel sulfide, a copper sulfide, a zinc sulfide, and alloy thereof, and a mixture thereof.

In another instance, the composition can be described as a sulfide modified support carrying the inorganic base. For example, the composition include a support modified with a transition metal sulfide (e.g., manganese sulfide, iron sulfide, cobalt sulfide, nickel sulfide, copper sulfide, zinc sulfide, alloys thereof, and mixture thereof) where the modified support carries the inorganic base (e.g., trona and/or calcium hydroxide).

In one specific example, the inorganic base is a calcium hydroxide, the sulfide is a copper sulfide and the support is selected from the group consisting of bentonite and montmorillonite. In another specific example, the inorganic base is a calcium hydroxide, the sulfide is an alkali metal sulfide and the support is selected from the group consisting of bentonite and montmorillonite. In yet another specific example, the inorganic base is sodium sesquicarbonate, the sulfide is a copper sulfide and the support is selected from the group consisting of bentonite and montmorillonite. In still another specific example, the inorganic base is sodium sesquicarbonate, the sulfide is an alkali metal sulfide and the support is selected from the group consisting of bentonite and montmorillonite.

Another embodiment is a process for manufacturing the above described compositions. The process can include providing the solid state admixture by intimately mixing the inorganic base and the sulfide. The intimate mixing can be provided by a process selected from the group consisting of ball milling, extruding, solid state mixing, grinding, coprecipitation, and a mixture thereof. The intimate mixing, preferably, includes reducing particle diameters of the inorganic base in the presence of the sulfide and/or reducing particle diameters of the sulfide in the presence of the inorganic base. Preferably, the process includes intimately mixing the inorganic base and the sulfide with a support; and when the support is included, the intimately mixing includes reducing the particle diameter of the support.

Still another embodiment is a process of capturing an environmental contaminant from a fluid employing the above described compositions. The process can include admixing a fluid containing an environmental contaminant with the above described composition, and then separating the fluid and the composition. The separated fluid preferably includes a lower concentration of the environmental contaminant after separation from the composition. Notably, the fluid can be a liquid or a gas. In one example the fluid is the flue gas produced by the combustion of coal. In another example, the fluid is a wet scrubber's discharge liquor.

The environmental contaminant can be mercury, selenium, lead, chromium, arsenic, cadmium, and a mixture thereof. Preferably, the described compositions separate mercury from the fluid.

In still yet another embodiment, a composition can include an admixture of anhydrous ammonia and a supported sulfide. The supported sulfide includes at least a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof. In one example, the admixture includes ammonium cations formed by a reaction of the anhydrous ammonia with the support. In another example, the admixture includes ammonia adhered to the surface of the supported sulfide.

In yet another embodiment, a process of capturing an environmental contaminant from a fluid can include admixing a fluid containing an environmental contaminant with anhydrous ammonia; admixing the fluid containing the environmental contaminant with a supported sulfide; and admixing the anhydrous ammonia and the supported sulfide in the fluid. The supported sulfide includes at least a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof.

In still another embodiment, a process of capturing an environmental contaminant from a fluid can include admixing anhydrous ammonia and a supported sulfide to provide a composition; and admixing the composition with the fluid containing an environmental contaminant. The supported sulfide includes at least a sulfide selected from the group consisting of an alkali metal sulfide, an alkali-earth metal sulfide, transition metal sulfide, and a mixture thereof, and a support selected from the group consisting of a silicate, an aluminate, an aluminosilicate, a carbon, and a mixture thereof.

The foregoing description is given for clearness of understanding only, and no unnecessary limitations should be understood therefrom, as modifications within the scope of the invention may be apparent to those having ordinary skill in the art.

What is claimed is:

1. A composition comprising:
   a particulate support carrying an inorganic base selected from the group consisting of sodium sesquicarbonate (trisodium hydrogendicarbonate), sodium carbonate, sodium bicarbonate, potassium carbonate, calcium carbonate, and a mixture thereof, and a sulfide selected from the group consisting of an ammonium sulfide, an alkali metal sulfide, an alkali-earth metal sulfide, transition metal sulfide, and a mixture thereof; wherein the inorganic base and the sulfide are individually distributed on a surface of the particulate support, and the inorganic base does not include calcium hydroxide, and the composition does not include calcium hydroxide.

2. The composition of claim 1 consisting essentially of the particulate support carrying the inorganic base and the sulfide.

3. The composition of claim 1, wherein the support is selected from the group consisting of a silicate, an aluminate, an aluminosilicate, a carbon, and a mixture thereof.

4. The composition of claim 3, wherein the support is a phyllosilicate selected from the group consisting of bentonite, montmorillonite, hectorite, beidellite, saponite, nontronite, volkonskoite, sauconite, stevensite, fluorohectorite, laponite, rectonite, vermiculite, illite, a micaceous mineral, makatite, kanemite, octasilicate (illierite), magadiite, kenyaite, attapulgite, palygorskite, sepoilite, and a mixture thereof.

5. The composition of claim 1, wherein the inorganic base is sodium sesquicarbonate, and a mixture thereof.

6. The composition of claim 1, wherein the sulfide is a polysulfide.

7. The composition of claim 1, wherein the sulfide is transition metal sulfide selected from the group consisting of a manganese sulfide, an iron sulfide, a cobalt sulfide, a nickel sulfide, a copper sulfide, a zinc sulfide, and a mixture thereof.

8. The composition of claim 3, wherein the inorganic base is a calcium carbonate, and the sulfide is a copper sulfide.

9. The composition of claim 3, wherein the inorganic base is a calcium carbonate, and the sulfide is an alkali metal sulfide.

10. The composition of claim 3, wherein the inorganic base is sodium sesquicarbonate, and the sulfide is a copper sulfide.

11. The composition of claim 3, wherein the inorganic base is sodium sesquicarbonate, and the sulfide is an alkali metal sulfide.

12. The process of capturing an environmental contaminant from a fluid, the process comprising:
    admixing a fluid containing an environmental contaminant with a composition comprising a particulate support carrying an inorganic base selected from the group consisting of sodium sesquicarbonate (trisodium hydrogendicarbonate), sodium carbonate, sodium bicarbonate, potassium carbonate, calcium carbonate, and a mixture thereof, and a sulfide selected from the group consisting of an ammonium sulfide, an alkali metal sulfide, an alkali-earth metal sulfide, transition metal sulfide, and a mixture thereof; wherein the inorganic base and the sulfide are individually distributed on a surface of the particulate support, and the inorganic base does not include calcium hydroxide and the composition does not include calcium hydroxide; and then separating the fluid and the composition;
    wherein the separated fluid includes a lower concentration of the environmental contaminant after separation from the composition.

* * * * *